United States Patent [19]

Cahuzac et al.

[11] Patent Number: 5,645,677
[45] Date of Patent: Jul. 8, 1997

[54] MACHINE FOR THE SIMULTANEOUS LAYING DOWN AND WINDING OF A PLURALITY OF INDIVIDUAL FIBER ROVINGS

[75] Inventors: Georges Jean Joseph Cahuzac, Le Bouscat; Bernard André Jollivet, Le Haillan; Jean-Claude Baudry, Pessac; Bruno Dubearn, Merignac; Laurent Sabary, Carbon-Blanc, all of France

[73] Assignee: Societe Anonyme dite Aerospatiale Societe Nationale Industrielle, Cedex, France

[21] Appl. No.: 248,410

[22] Filed: May 24, 1994

[30] Foreign Application Priority Data

May 26, 1993 [FR] France .................... 93 06613

[51] Int. Cl.$^6$ .................................. B65H 81/00
[52] U.S. Cl. .............. 156/361; 156/425; 156/433; 156/441; 156/523; 156/574
[58] Field of Search .................. 156/433, 425, 156/441, 173, 175, 523, 361, 574

[56] References Cited

U.S. PATENT DOCUMENTS

| | | | |
|---|---|---|---|
| 3,112,234 | 11/1963 | Krupp | 156/175 |
| 3,492,187 | 1/1970 | Hirtzer | 156/433 |
| 3,574,040 | 4/1971 | Chitwood et al. | 156/547 |
| 4,679,291 | 7/1987 | Schmeal et al. | |
| 4,699,683 | 10/1987 | McCowin | |
| 4,863,660 | 9/1989 | Cahuzac et al. | |
| 4,869,773 | 9/1989 | Perkins | |
| 4,869,774 | 9/1989 | Wisbey | |
| 4,872,619 | 10/1989 | Vaniglia | 156/361 |
| 4,877,471 | 10/1989 | McCowin | 156/441 |
| 4,917,756 | 4/1990 | Cahuzac et al. | |
| 5,019,435 | 5/1991 | Cahuzac et al. | |
| 5,022,952 | 6/1991 | Vaniglia | 156/441 |
| 5,045,147 | 9/1991 | Benson et al. | 156/433 |

FOREIGN PATENT DOCUMENTS

| | | |
|---|---|---|
| 0267865 | 5/1988 | European Pat. Off. . |
| 0361828 | 4/1990 | European Pat. Off. . |

OTHER PUBLICATIONS

Don O. Evans & Milo M. Vaniglia, "Fiber Placement Process Study," SAMPE 34th Symposium Book of Proceedings, May 8–11, 1989.
French Search Report and Annex.

*Primary Examiner*—Geoffrey L. Knable
*Attorney, Agent, or Firm*—Greenblum & Bernstein P.L.C.

[57] ABSTRACT

Machine is provided for the simultaneous laying down/winding of a plurality of rovings, including a gantry supporting a laying down/winding head carrier mechanism plate movable along the X,Y,Z directions, at least one laying down/winding head rotatably mounted on the mechanism plate around at least one vertical axis and comprising a laying down/winding roller, a mechanism for presenting on the roller rovings along at least two tangent laps, selective mechanisms for driving and cutting each roving, and spools delivering the rovings. The spools are mounted on a fixed creel and the rovings are guided between the creel and the head by sets of return pulleys disposed in such a way as to limit the surface scanned by the rovings and reduce the jerks of the roving reeling speed. The machine is especially adapted for production of composite structures.

18 Claims, 16 Drawing Sheets

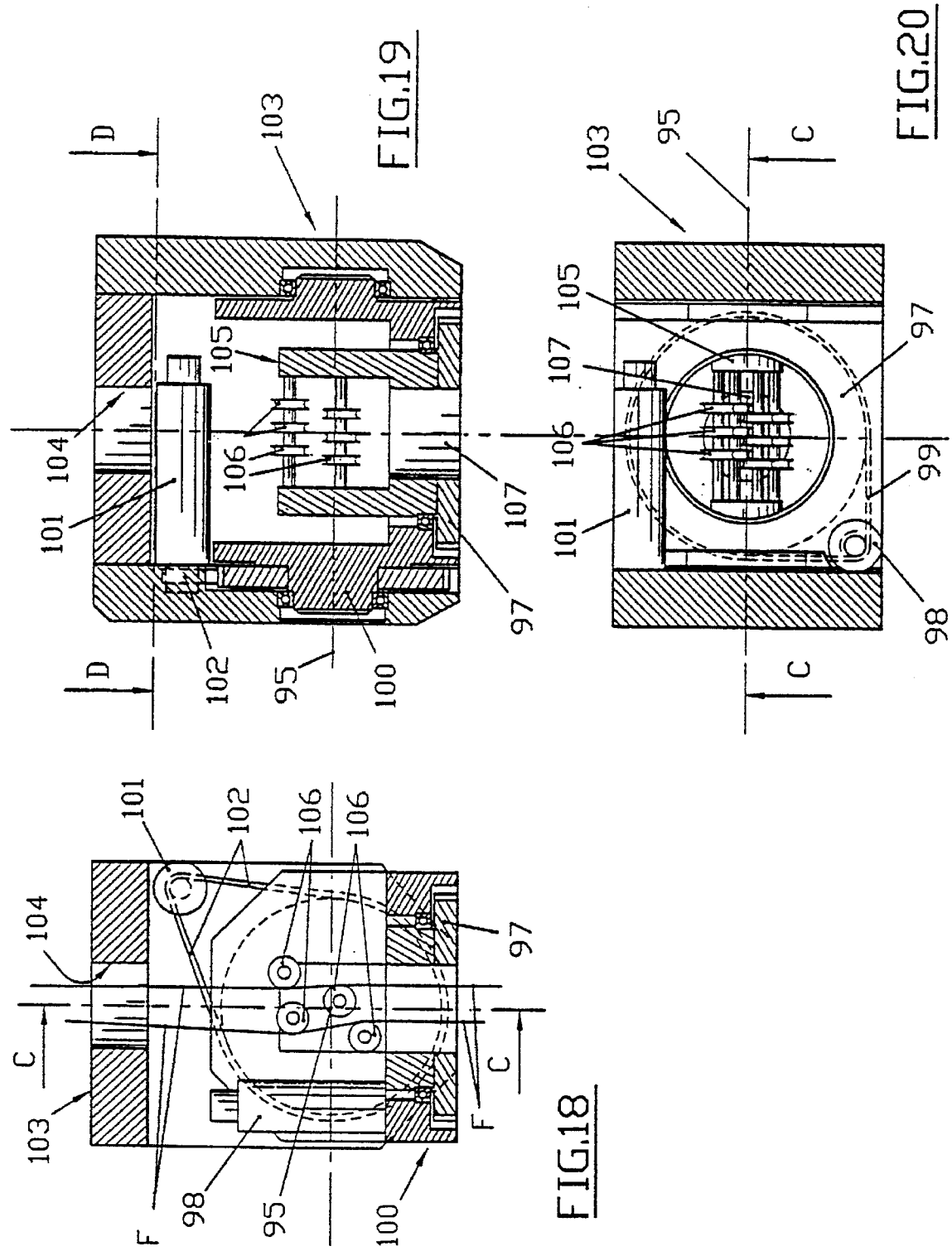

MACHINE FOR THE SIMULTANEOUS LAYING DOWN AND WINDING OF A PLURALITY OF INDIVIDUAL FIBER ROVINGS

FIELD OF THE INVENTION

This invention relates to the embodiment of composite structures and more specifically of pieces with more or less complex forms constituted by superimposing on an appropriate support preimpregnated continuous layers of fibers set by laying down or winding.

BACKGROUND OF THE INVENTION

The purpose of the invention is to produce a multipurpose machine capable of both simultaneously winding and laying down several fiber rovings on a given support and more specifically a further large number of rovings.

In this description, fiber roving means a group of continuous agglomerated fibers in the form of a strip or band stored on a spool.

There already exist various machines able to wind or lay down several preimpregnated rovings at the same time.

FP-A-O 361 828 describes a machine for laying down several rovings disposed in a lap and applied by a mobile head along several axes and supported by a gantry and disposed in such a way as to lay down the rovings on a rotation body around a horizontal axis.

The rovings are unwound from the spools embarked on the mobile head carrier mounting harness.

This disposition is expressed by a significant spatial requirement and weight of the mobile mounting harness bearing the spools, thus considerably limiting the number of distinct rovings to be laid down and the movement capacities in the space of the laying down head.

According to another drawback, if any problem occurs on one of the spools, such as a roving breaking, accessibility to the spool for repair poses a delicate problem, especially if the piece being laid out is large.

U.S. Pat. No. 4,679,291 concerns a given type of gantry machine for contact laying down fibers on the wall of a fixed mould. This machine has the same drawbacks, even more significant as regards the movement and positioning capacities of the laying down head and accessibility to the spools of fibers owing to the fact that the piece to be laid out is immobile and has extremely large dimensions.

U.S. Pat. No. 4,699,683 also discloses a gantry machine for the simultaneous laying down of a plurality of rovings on an element with the aid of an applying device borne by a multi-axes laying down head disposed in such a way as to support the fiber spools.

This disposition considerably adds weight to the laying down head, renders it less maneuverable and less able to be positioned in the air. In this respect, it should be noted that the mobility of the laying down head is possible along the three Cartesian directions X,Y,Z and only two spin axes, vertically horizontally and orthogonally to the axis of the device applying the rovings, which thus limits the possibilities of laying down of the head which can thus only rotate around one axis parallel to that of the applying device.

SUMMARY OF THE INVENTION

The invention seeks to resolve these problems and drawbacks by providing a machine able to indifferently effect a winding on an element rotating around an axis or a laying down on a fixed or mobile element of a plurality of rovings simultaneously by means of maneuverable and light head.

With this object in view, the purpose of the invention is to produce a machine for the laying down or winding of a plurality of individual rovings simultaneously and comprising:

- a gantry supporting a head carrier mechanism plate for winding and laying down which is mobile in the three Cartesian marking directions,
- at least one laying down and winding head mounted mobile in rotation on the plate around at least one vertical axis and comprising a winding/contact laying down roller mobile on the head in the direction of the support to be laid out, means for introducing the rovings on the roller along at least two tangent laps, selective means for driving and cutting each roving, and
- a plurality of spools delivering the rovings, wherein the spools are mounted on a fixed creel and the rovings are guided between the creel and the contact laying down/winding head by sets of return pulleys disposed in such a way as to limit the surface scanned by the rovings and reduce the jerks of the reeling speed of the rovings.

According to one application of the invention concerning laying down/winding of elongated elements driven in rotation around their axis, the machine comprises several heads mounted in parallel on the plate fed with rovings by the same creel and able to lay out simultaneously via laying down/winding as many pieces as required disposed in parallel on a given bench ensuring the rotation of each element in synchronism with the machine.

According to another characteristic of the machine, each laying down/winding head comprises:

- a circular flange provided with a central passage for the rovings and fixed to an element mounted on the plate, driven in rotation around the vertical axis and provided with a central passage for the rovings,
- a support mounted on the flange so as to move in translation along an axis merged with the spin axis of the head, the support bearing the laying down/winding roller and the means to drive and cut the rovings, as well as the set of guide and non-return pulleys for guiding the rovings,
- the rovings being driven and being grouped into a bundle approximately parallel to the axis of the flange and rotating element and guided with the aid of a fiber-guide grid mounted freely rotating in the central passage of the rotating element.

According again to another characteristic of the machine, each roving of each laying down/winding head comprises a drive device comprising a roller mounted on a free wheel driven at the same time as the laying down/winding roller but with a speed slightly slower than that of the roller, a presser roller possibly applying the roving against the driving roller and a wire reverse-lock device in case a roving is cut.

According again to another characteristic of the machine, each laying down/winding head comprises a device for compacting rovings set on the element to be laid out and disposed immediately close to the laying down roller and formed of two independent rollers rotating freely around two axes which respectively move to the center of the contact zone of each roller with the surface to be laid out and enabling each roller to be oriented independently with respect to this surface, means being provided to continuously clad the rollers against the surface to be laid out.

According to one application of the invention upon the laying down of static elements, the laying down/winding head is provided with two other spin axes.

To this effect, according to one embodiment, the flange of each laying down/winding head is rotatably-mounted on a first seating rotatably-mounted on a second seating rotatably-mounted on the mechanism plate around the vertical axis, the spin axis of the first seating being perpendicular both to the spin axis of the flange and the spin axis of the second seating.

According again to another characteristic of the machine, for each roving the creel is provided with a device to deliver, brake and cancel the reeling tension and comprising a pneumatic motor for driving in rotation the roving spool and a poppet type automatic control device formed of an electric variable speed gear driving a pulley for pulling the roving, a poppet, a potentiometer whose spin axis is integral with the spin axis of the poppet and whose center point controls the inlet of the unit of the variable-speed gear and a device to control the arm of the poppet, so as to enable the roving to be reeled with tensions appropriate for winding and laying down.

BRIEF DESCRIPTION OF THE DRAWINGS

Other characteristics and advantages shall be more readily understood from a reading of the following description of an embodiment of a machine according to the invention, this description being given solely by way of example and with reference to the accompanying drawings in which:

FIG. 6A is a bottom view of the disc-shaped grid;

FIG. 18 is an enlarged view of the mounting structure inserted between the head of FIG. 17 and the head-support girder mobile along Z;

FIG. 19 is a cross-sectional view along the line C—C of the device of FIG. 18, and FIG. 20 is a cross-sectional view along the line D—D of the device of FIG. 19.

DETAILED DESCRIPTION OF THE PREFERRED EMBODIMENTS

Figure 1:
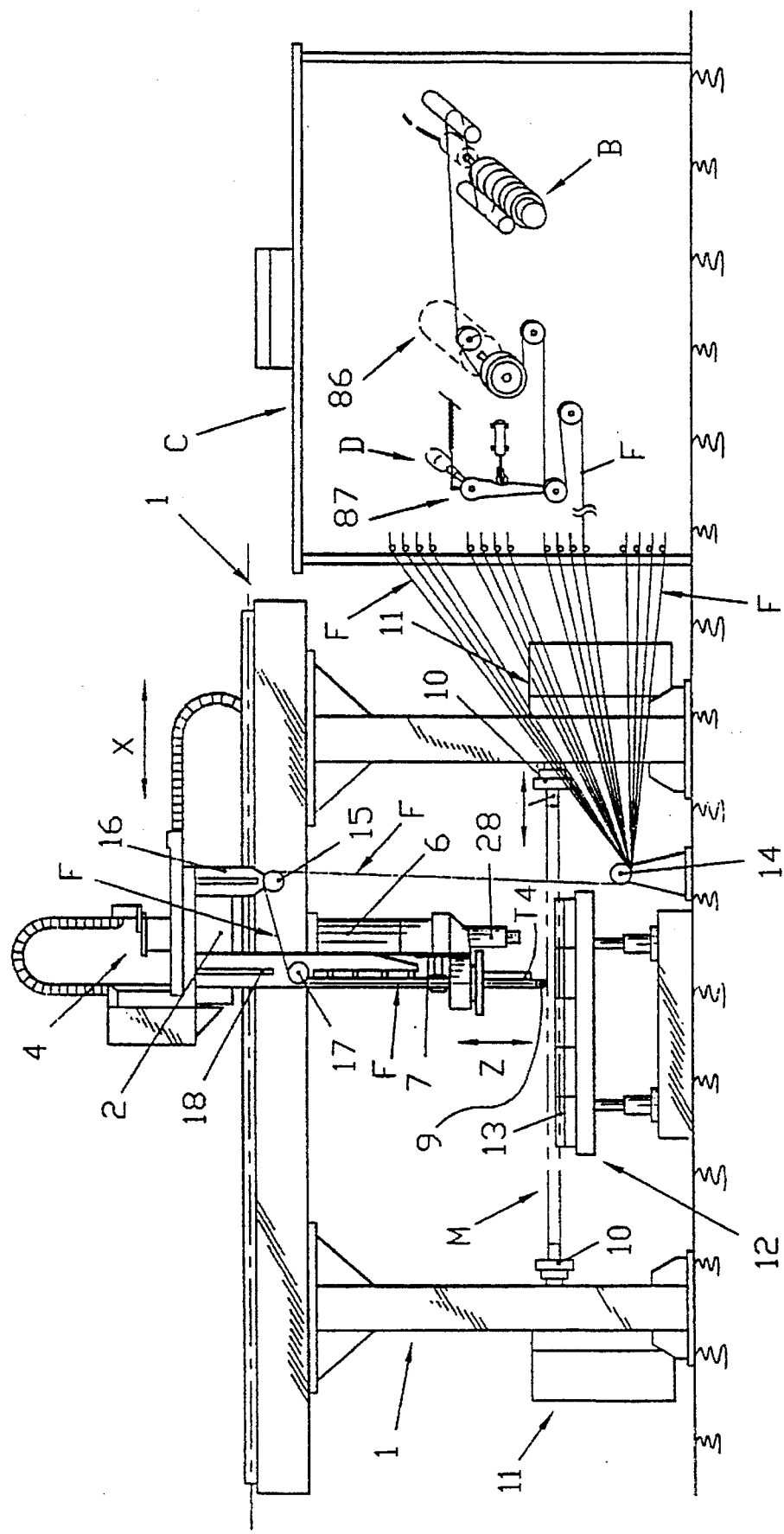
FIG. 1 is a front side diagrammatic view of a machine according to the invention.
Figure 2:
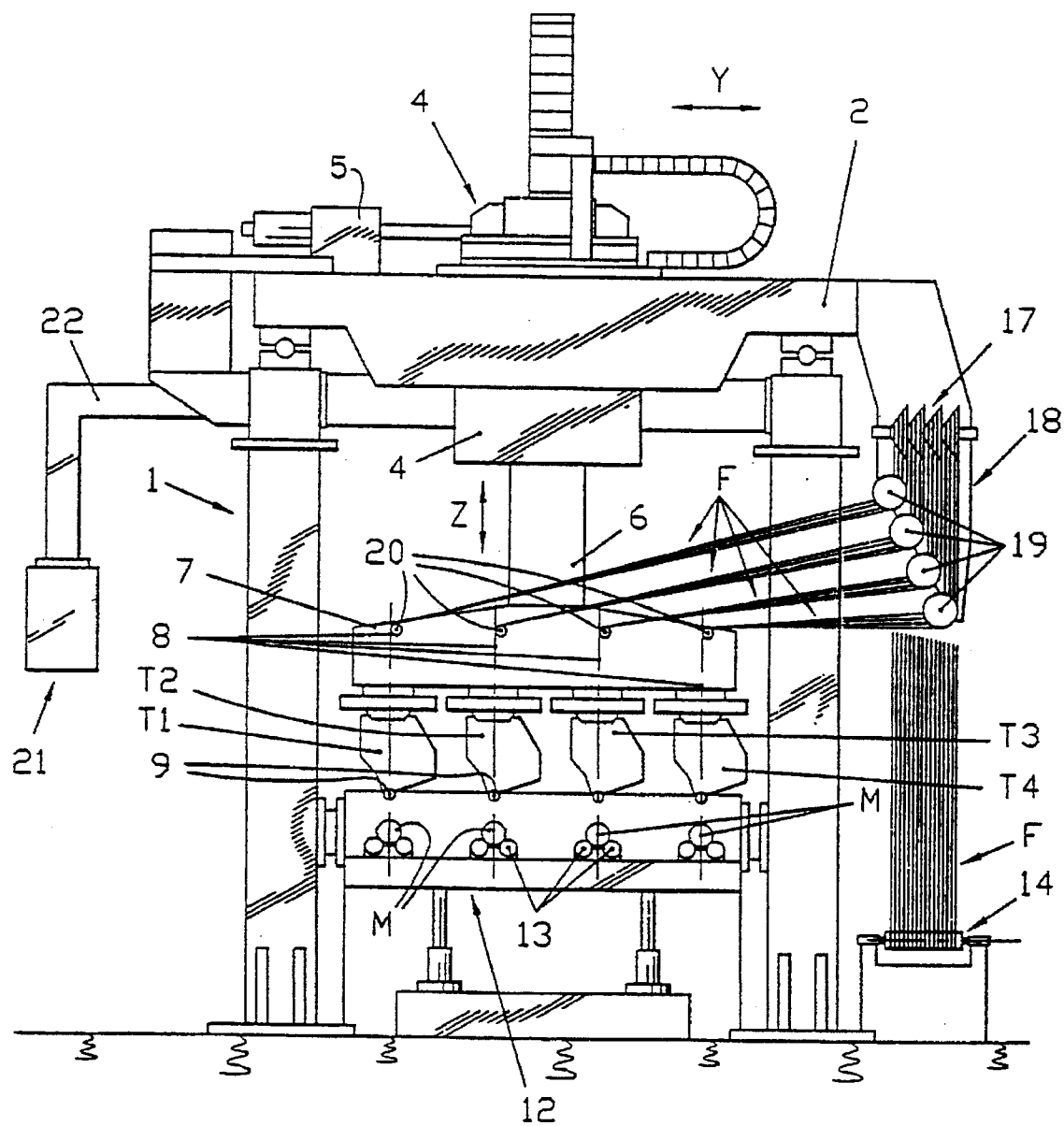
FIG. 2 is a left view of the machine of FIG. 1.
Figure 3:
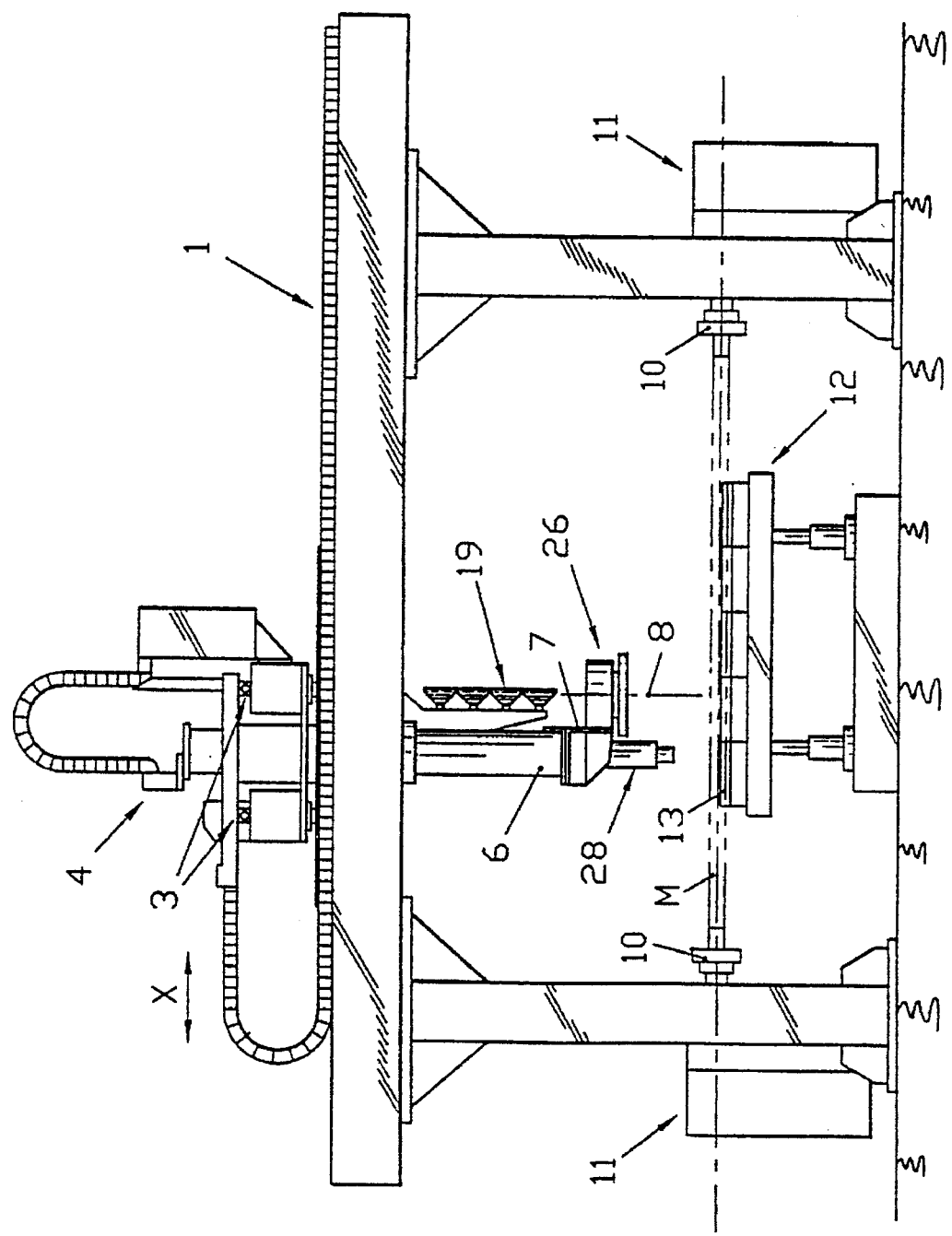
FIG. 3 shows the machine of FIG. 1 as viewed from the other side.

FIGS. 1 to 4 diagrammatically represent a laying down/winding machine according to the invention and more specifically a machine with four laying down/winding heads working in a parallel.

The machine conventionally comprises a gantry 1 bearing a first mobile carriage 2 along a first horizontal direction X parallel to the longitudinal axis of the gantry 1 with the aid of suitable embarked motors 3.

The carriage 2 bears a second mobile carriage 4 along a second horizontal direction Y perpendicular to the direction X with the aid of suitable motors 5 embarked on the carriage 4.

The second carriage 4 bears a vertical girder 6 mounted for vertical movement on the carriage 4 along a direction Z.

A head-support laying down/winding mechanism plate 7 in the shape of a horizontal girder is fixed to the lower end of the girder 6.

In the embodiment illustrated in FIGS. 1 to 4, the plate 7 carries four identical heads T1 to T4 (diagrammatically shown solely in FIGS. 1 and 2) disposed side by side in a line along the transverse axis of the gantry, that is along the direction Y, but the plate could equally carry a different number of heads, namely one, two, three or even more than four.

All the heads T1 to T4 are mounted to be rotatably-mobile on the girder-shaped plate 7 around a vertical axis symbolized in 8. Each head T1 to T4 comprises a laying down/winding roller 9 with a horizontal axis.

The heads T1 to T4 are each able to be driven opposite or in contact with a mandrel symbolized at M in FIGS. 1 to 4, and on which an element shall be embodied, for example a composite connecting rod.

To this effect, the mandrels M are placed parallel to horizontal along the direction X between two poppets 10 of a multi-station turning bench 11, the mandrels M being presented on the bench and, following laying down/winding, are removed with the aid of a high mobile table 12 bearing the loose support rollers of the mandrels M, respectively, opposite each head T1 to T4.

As shall be seen in more detail hereafter, each head T1 to T4 is fed by six rovings symbolized at F in FIGS. 1 to 4 and derived from, according to one main characteristic of the invention, the spools B borne by a static creel C totally distinct from the heads and the gantry 1 and placed in one of the angles of the gantry (FIG. 4) so as to deliver all the rovings F, namely twenty-four in all, along a lap situated inside a vertical plane parallel to the longitudinal axis (direction X) of the gantry 1 laterally to the latter. To simplify matters, in FIGS. 1 and 2, only four rovings F have been shown via the laying down/winding heads T1 to T4 and the creel C is symbolized by a rectangle inside which is shown in enlarged scale the device to reel off, brake and regulate the tension of a roving F. Of course, each roving delivered by the creel corresponds in the latter to a device D identical to the one shown in FIG. 1 and shall be described subsequently.

According to another characteristic of the invention, the rovings F are disposed spatially and guided between the creel C and the heads T1 to T4 so as to scan the minimum space when the heads move and reduce the jerks of the reeling speed of the rovings.

To this effect, the vertical lap of the rovings F is delivered by the creel laterally to the evolution space of the laying down/winding heads by being sent onto a set of identical return pulleys 14 borne by a horizontal axis parallel to the direction Y, fixed and disposed adjacent to the ground and from the end, creel C side, of the elements during laying down and winding.

The pulleys 14 send the rovings F onto an identical set of pulleys 15 borne by an axis parallel to that of the pulleys 14 and connected to the carriage 2 by means of a support 16.

The pulleys 15 direct the rovings F onto another set 17 of pulleys mounted on an axis parallel to that of the pulleys 15 and connected to the carriage 2 by a support 18.

The pulleys 17 are divided into four sets, namely one per laying down/winding head T1 to T4, with six pulleys with different cascade diameters for bringing the rovings approximately to the level (in the direction X) of the heads T1 to T4.

The rovings F then move from the pulleys 17 to another set of four sets of pulleys 19 for directing the rovings towards the head-support horizontal girder 7.

The pulleys 19 have in each set different cascade diameters end, are disposed along axes orthogonal to the axis of the pulleys 17 and offset heightwise and laterally.

The pulleys are disposed at a height as close as possible from the girder 7, thus remaining at a sufficient height so as to pass above the head of the machine operators.

The rovings F are received on the girder 7 on identical pulleys 20 placed on an axis parallel to that of the pulleys 19 and thus to the direction X, plumb with the four heads T1 to T4.

Figure 4:
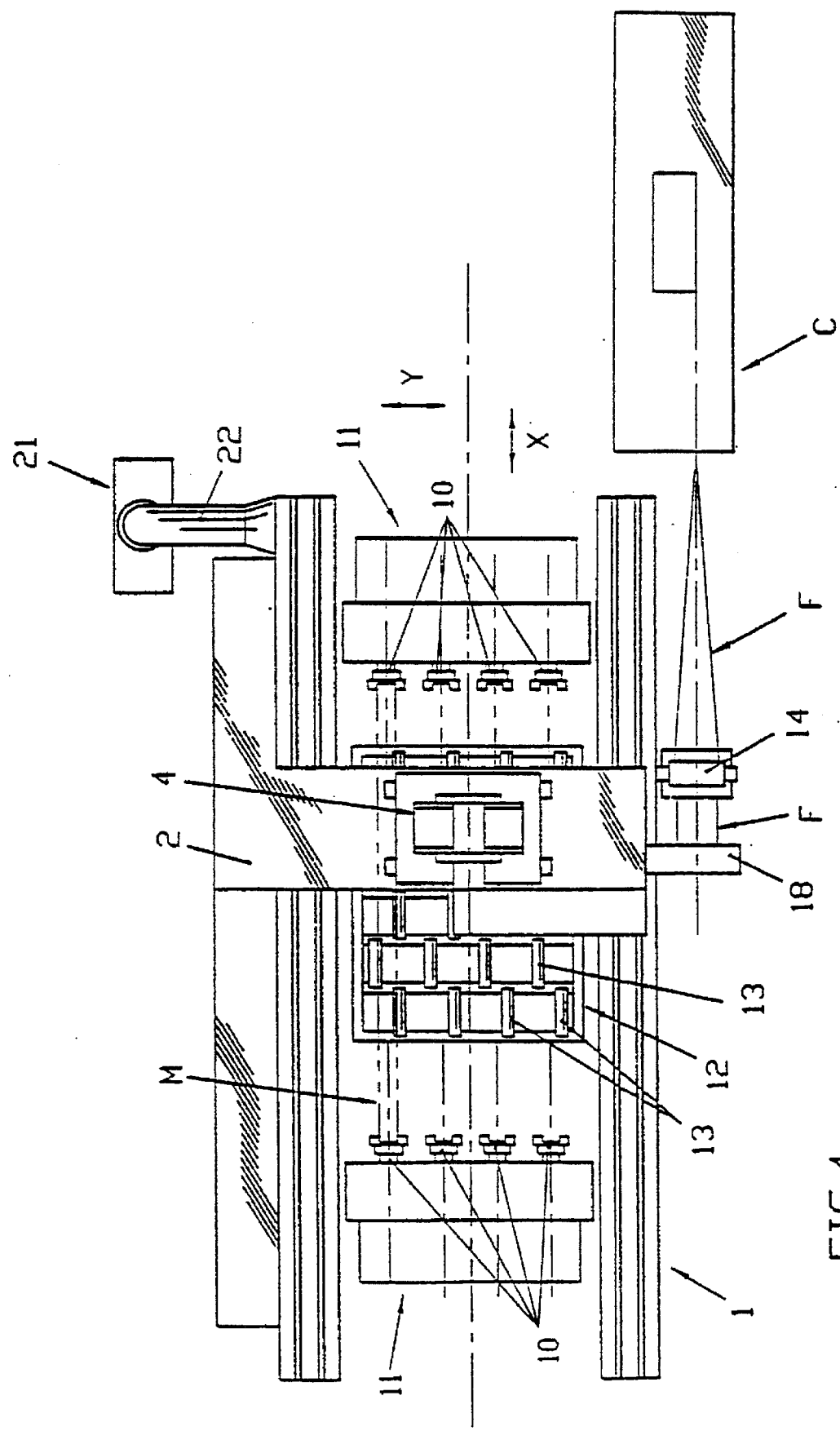
FIG. 4 is a top view of the machine of FIG. 1.

Finally, shown at 21 (FIGS. 2 to 4) is a machine control console suspended from a girder 22 integral with the gantry 1 at one of its angles (FIG. 4).

There now follows a description according to a first embodiment of one of the laying down/winding heads of the machine with reference to FIGS. 5 to 12.

Figure 5:
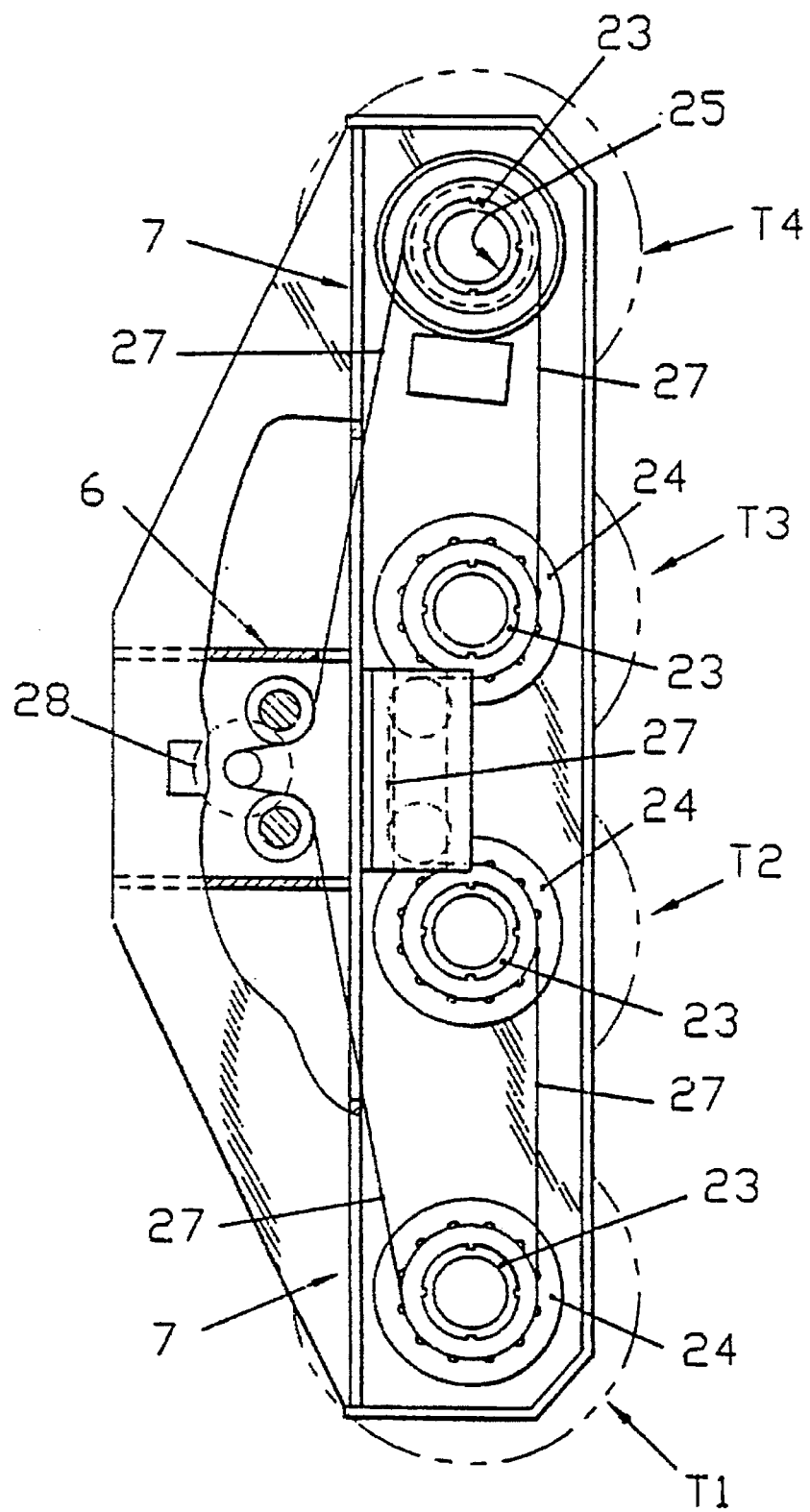
FIG. 5 is a top view of the laying down/winding heads unit of the machine.

The contact winding and laying down head T shown in FIG. 5 is mounted mobile in rotation around a single vertical axis 8 on the girder-shaped plate 7 by means of a rotating element 23 at the lower part of which fixed is a circular flange 24 on which the head T is mounted.

The rotating element 23 has a central well 25 coaxial to the axis 8 for the passage of the rovings F and is swirling-mounted on an annular support unit 26 mounted laterally to the girder-shaped plate 7.

The driving in rotation of the element 23 is effected with the aid of a synchronous belt 27 moved by an electric motor 28 integral with the girder 7, a single motor 28 driving by a given belt 27 the various winding/laying down heads T1 to T4 (FIG. 5) of the machine.

Disposed above the well 25 of the rotating element 23 are the pulleys 20 sending to the head T the rovings F which are guided in the well 25 by a circular disc-shaped grid 29 (FIG. 6A) pierced with six holes 30 for the six rovings F. The disc-shaped grid 29 with an axis coaxial to the axis 8 is mounted mobile in rotation at the lower end of a support rod 31 whose end is fixed to a bracket 32 integral with the girder-shaped plate 7.

The flange 24 is also pierced with a central hole 33 coaxial to the well 25 for the passage of the rovings F.

Mounted laterally to the hole 33 (FIGS. 8 and 10) on the lower surface of the flange 24, is a vertical support 35 (FIG. 8) bearing a jack 36 for moving vertically via a linking element 37 a support plate 38 slightly offset with respect to the axis 8 and the hole 33. The support plate 38 bears on the side opposite the jack 36 the means for bringing and guiding the rovings F to the laying down/winding roller 9 and the various other means for pushing, cutting and holding the rovings shall now be described in more detail which, for simplicity, are not shown in FIGS. 8 and 10 but are only illustrated in FIGS. 6,7 and 9 to 12.

The plate 38 is vertically guided by appropriate means along the fixed element 35 and carries below and on both sides of the well formed by the hole 33 two opposite sets 39 and 40 of pulleys 39a, 39b, 39c; 40a, 40b, 40c (FIGS. 6 and 7) each mounted on a free non-return roving wheel and each cooperating with a loose roller 39d, 40d provided with a toric joint pressing the roving at the bottom of the groove of the associated pulley at the end of the roving contact zone on the pulley. The pulleys 39a, 39b, 39c; 40a, 40b, 40c are mounted on oscillating levers 41 so as to free laying down of the rovings.

The rovings of the set of pulleys 39 are directed (FIG. 6) via return pulleys 42,43 onto a set 44 of three twin rollers, whereas the rovings of the set of pulleys 40 are directed via the return pulleys 45 onto a set 46 of three other twin rollers.

Joined to the axis of the pulleys 42,45 (FIGS. 6 and 9) is a square lever 34a bearing at one end (FIG. 6) a roller 39d, 40d whose other end (FIG. 9) is biassed by a spring 34b for adjusting the pressure of said roller.

The set of rollers 44,46 are conventionally used so as to normally have the rovings at two laps F1 and F2 with three rovings side by side directed tangentially to the laying down/winding roller 9.

Disposed between the roller 44,46 and the roller 9 is a corner shaped shoe 47 on the two opposing faces from which the two laps F1,F2 are directed.

Upward of the shoe 47, a wire pushing device is provided and included for each lap F1,F2 including a drive roller 48 mounted on a free wheel 49 (FIGS. 6 and 7) and driven by a synchronous belt 50 also geared with the roller 9.

Each roller 48 cooperates with three antagonistic presser rollers 51 for driving three rovings of the lap in question (F1,F2).

The three rollers 51 of a given roller 48 are superimposed and controlled independently by three flat superimposed pneumatic jacks 52 disposed (FIG. 9) on the face of the plate 38 opposite the one on which the rollers 48,51 are disposed.

The jacks 52 selectively activate the rollers 51 via an articulated lever system 53 around an axis 54 traversing the support plate 38.

When a roller 51 is brought into contact by its control jack 52 with the associated roller 48, the corresponding roving is gripped and driven by the roller 48.

On the other hand, when the roller 51 is distanced from the roller 48, the roving is not driven.

Disposed on the two opposing faces of the shoe are two sets of three fiber cutting devices whose principle is well-known. The three cutting devices of each set are disposed side by side opposite the corresponding rovings and are conventionally formed of a cutting blade 55 (FIGS. 11,12) mounted at the end of an articulated lever 56.

Figure 9:
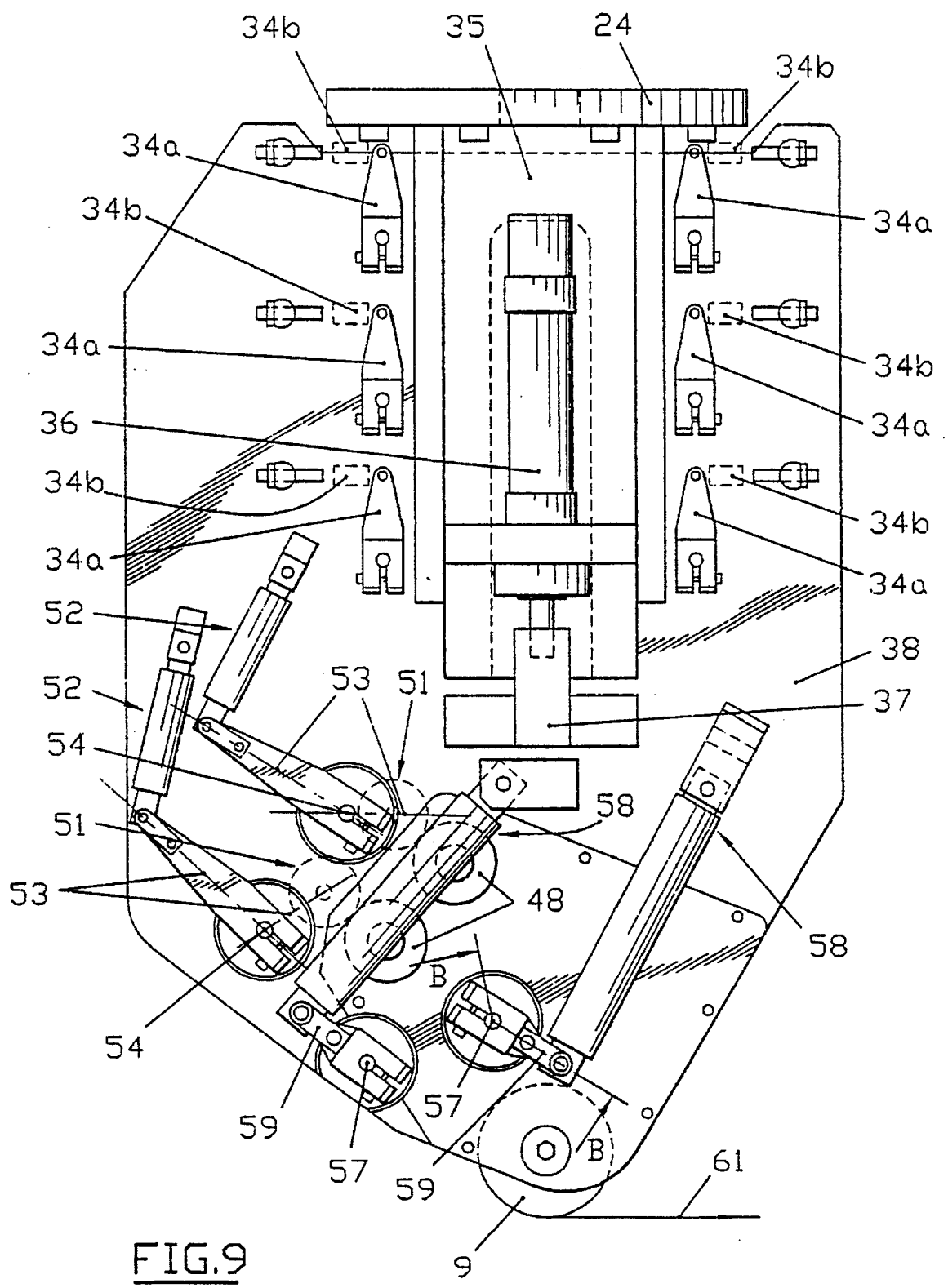
FIG. 9 is a view of the laying down/winding head of FIG. 6 showing the front of the head opposite that of FIG. 6.
Figure 10:
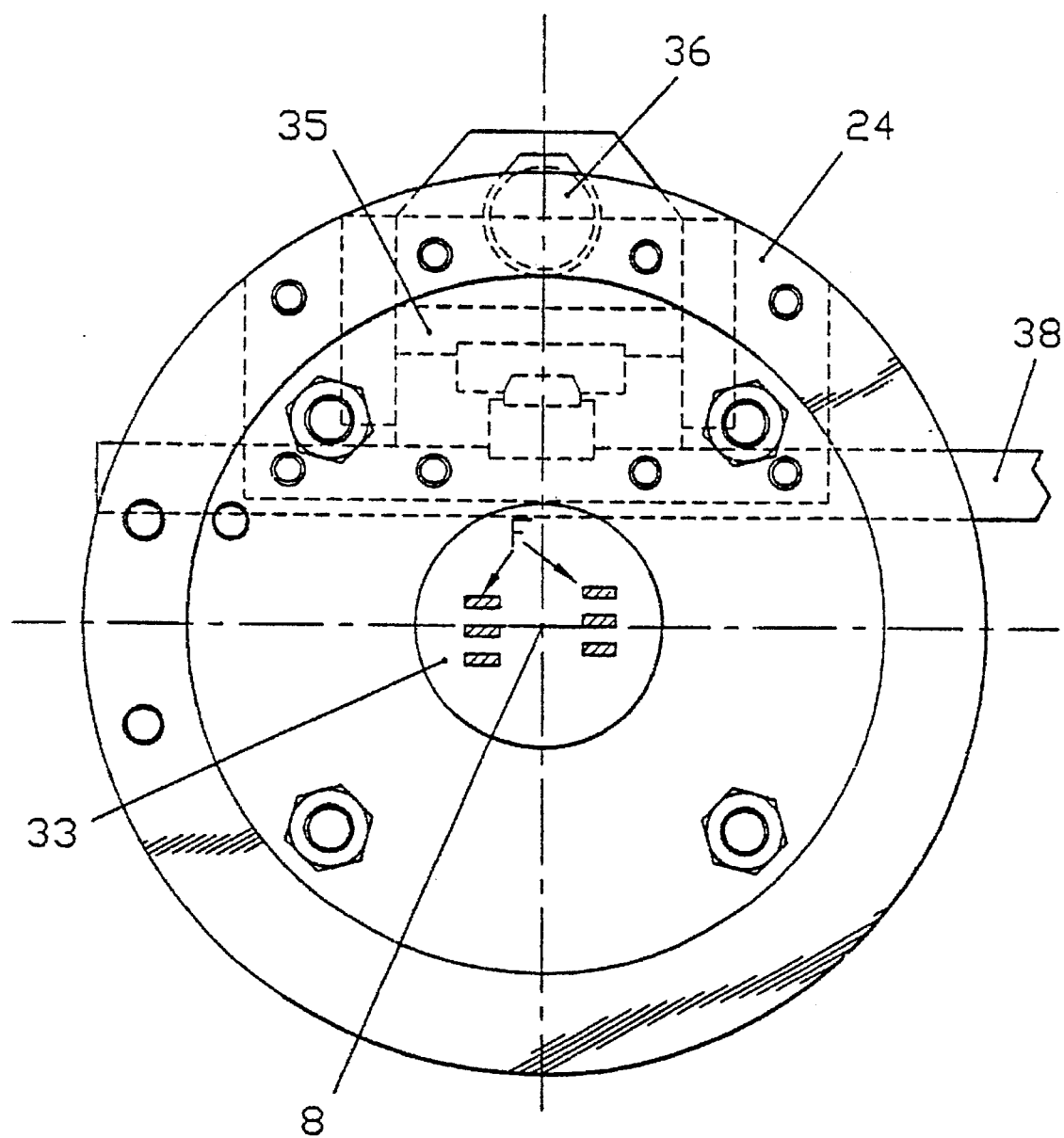
FIG. 10 is a top partial view of the laying down/winding head of FIG. 6 showing the admission of rovings and the side disposition of the head support plate.
Figure 12:
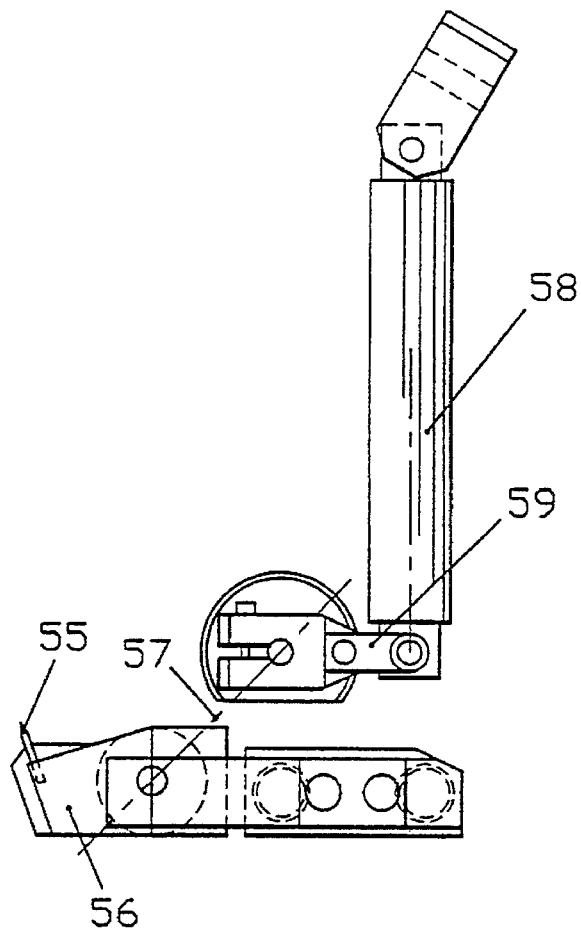
FIG. 12 is an exploded view of a roving cutting device.
Figure 11:
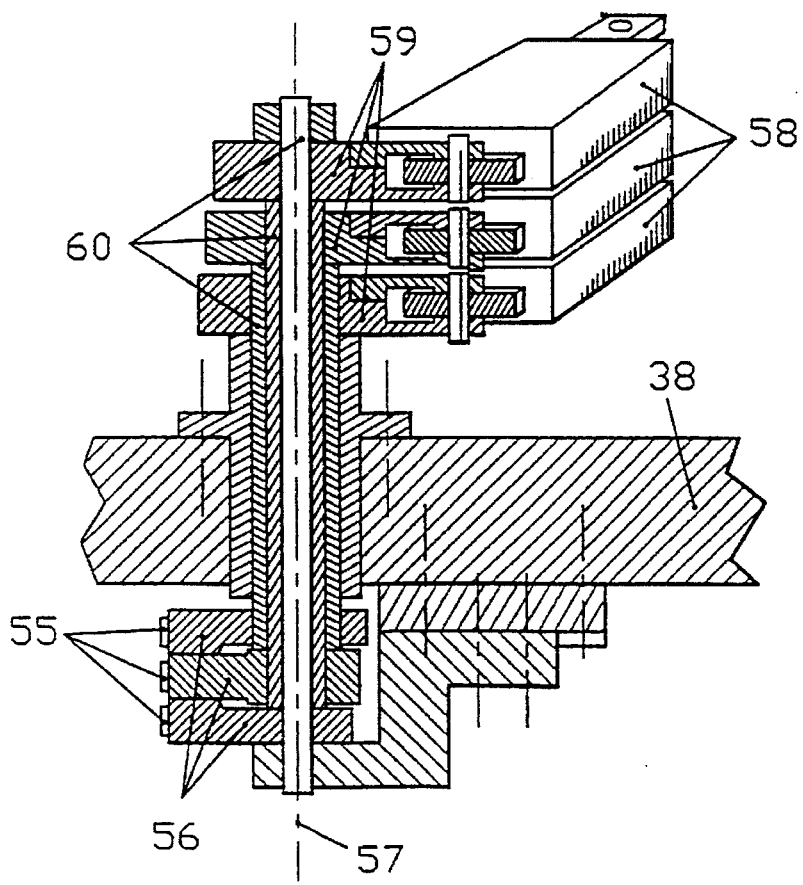
FIG. 11 is a partial cross-sectional view along the line B—B of FIG. 9 and means for activating the roving cutting devices.

Illustrated in FIGS. 11 and 12 are three levers 56 each bearing a blade 55 and mounted, in accordance with the invention, oscillating on a common axis 57 traversing the support plate 38, the cutting members being disposed one side of the plate and the control means being disposed on the other side (FIG. 9).

These control means are formed of three flat superimposed pneumatic jacks 58 acting on suitable levers 59 on superimposed (tubular or full) elements 60 coaxial to the axis 57 and each controlling one lever 56.

According to another characteristic of the laying down/ winding head of the invention, the rollers 48 are determined in such as way as to have a peripherical speed slightly slower than that of the roller 9. This, combined with the mounting of the rollers 48 on a free wheel 49, has a particular advantage should a roving be cut. In fact, when a roving is cut by one of the devices (55), the two ends of this roving will be distanced from each other owing to the fact that the drive speed communicated by the roller 9 is faster than that of the rollers 48. Thus, the downward end will be placed by the roller 9 without the upward end, which stands back, being applied by the roller on the element to be covered. When the upward end reaches the rollers 9, it shall be controlled by the latter which cause it to accelerate so as to restore it with its normal unwinding speed.

These differential movements are possible by virtue of the free wheel 49.

Figure 6:
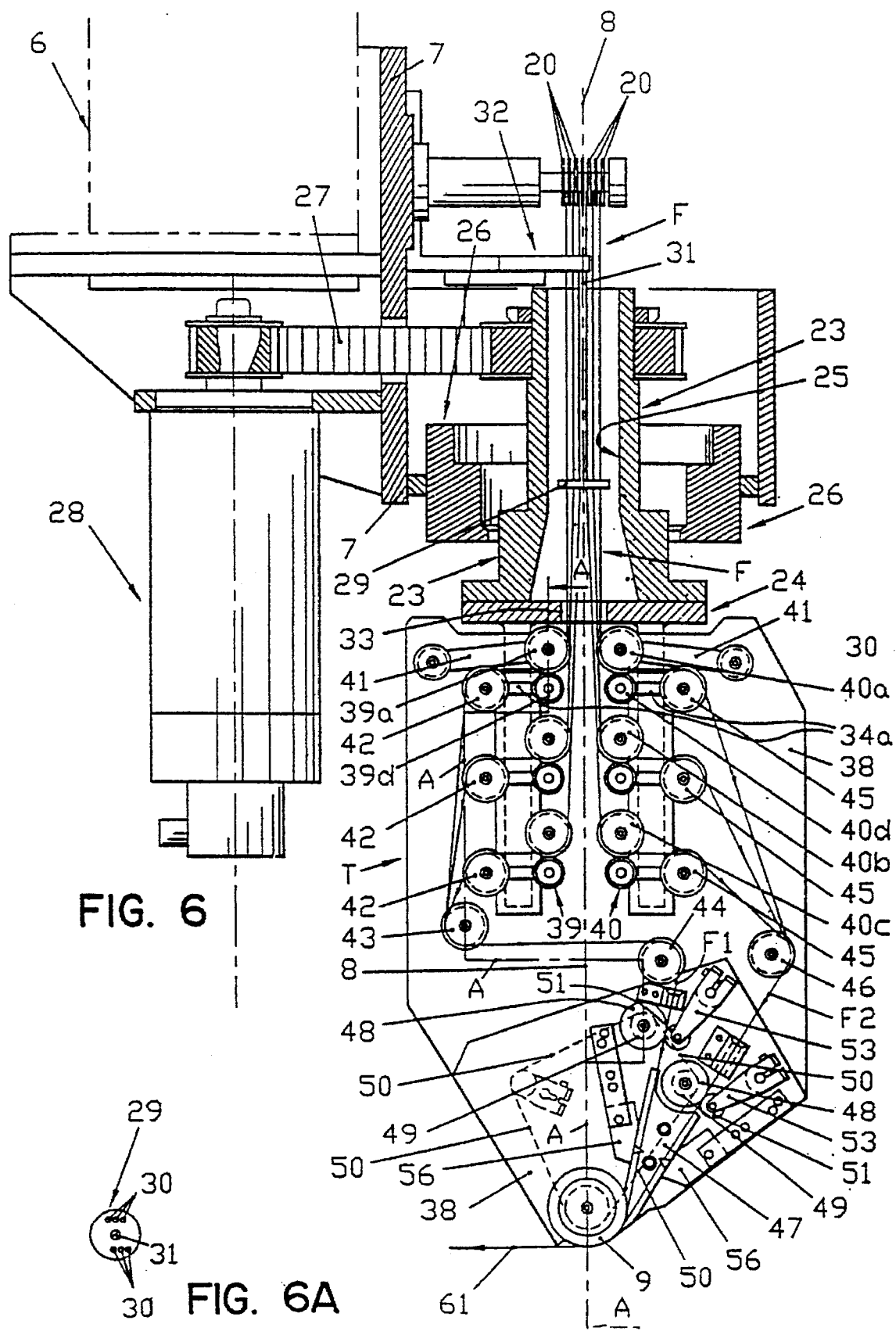
FIG. 6 is a front side view of a laying down/winding head.
Figure 7:
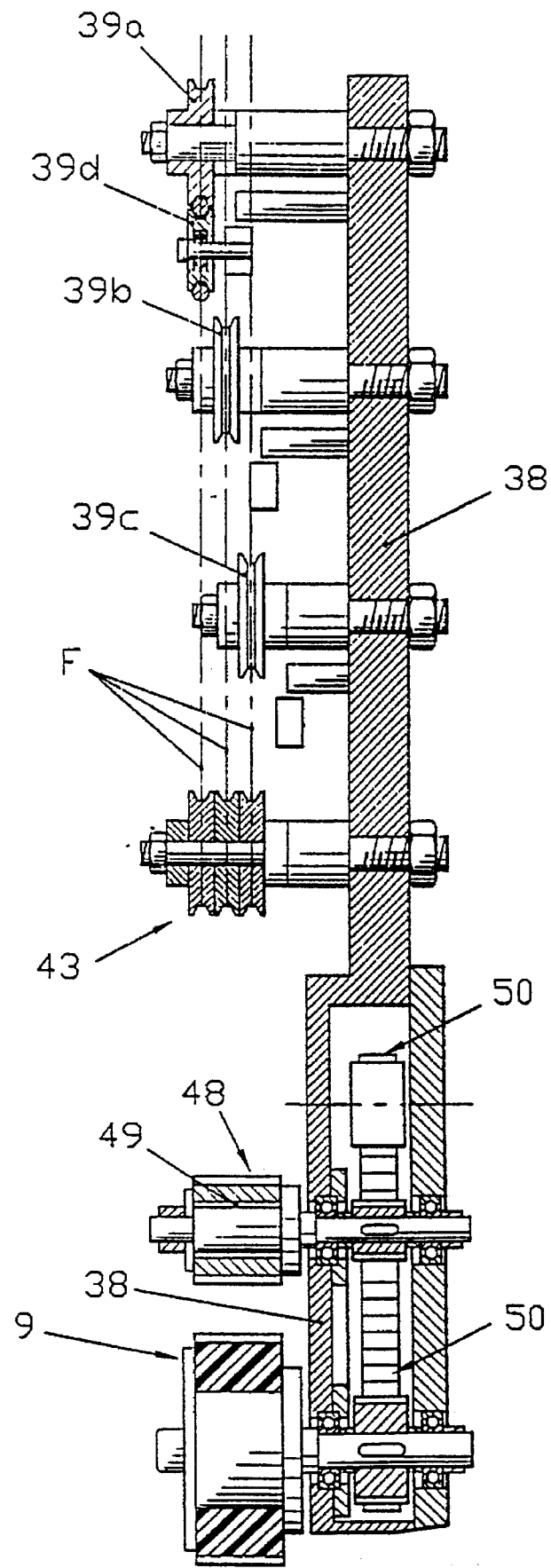
FIG. 7 is a cross-sectional view along the line A—A of the device of FIG. 6 showing solely and partially the members represented in FIG. 6.
Figure 8:
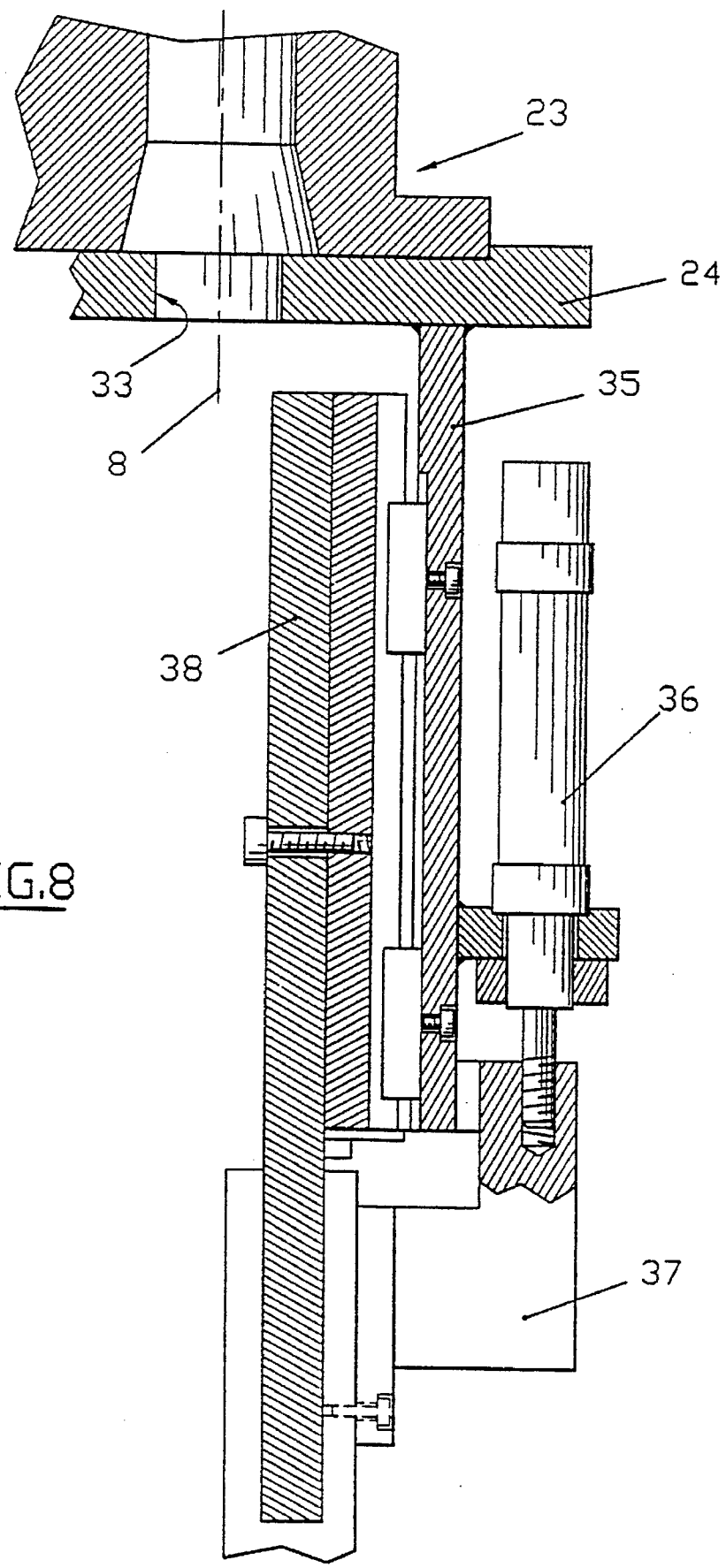
FIG. 8 is a cross-sectional view along the line A—A of the device of FIG. 6 showing the members used to ensure a constant pressure on the laying down roller.

FIGS. 6 and 9 show at 61 the six rovings in a single lap laid down side by side by the roller 9 on a (not shown) element.

Figure 13:
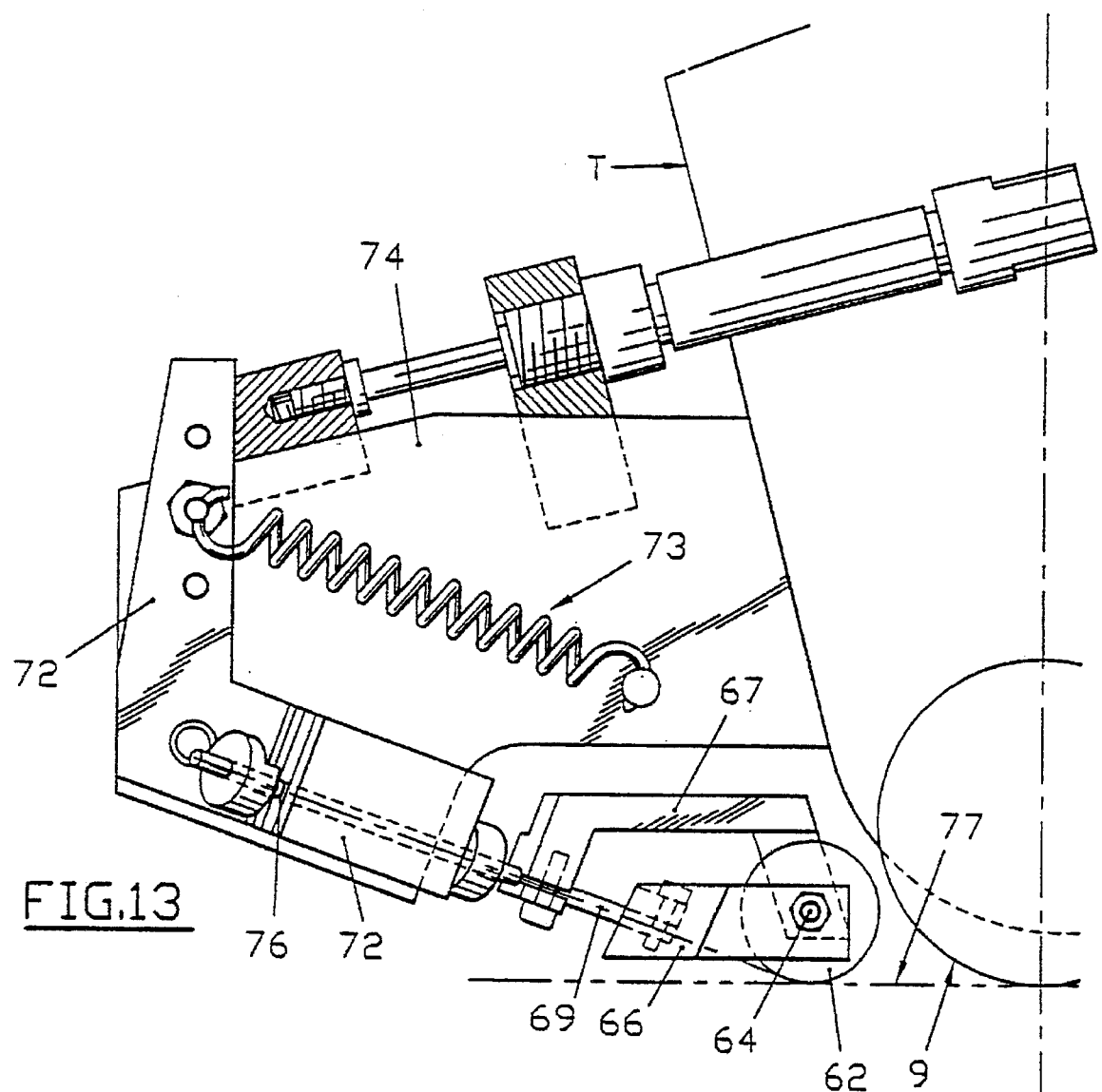
FIG. 13 is a front side view of a compacting device associated with the laying down/winding head.
Figure 14:
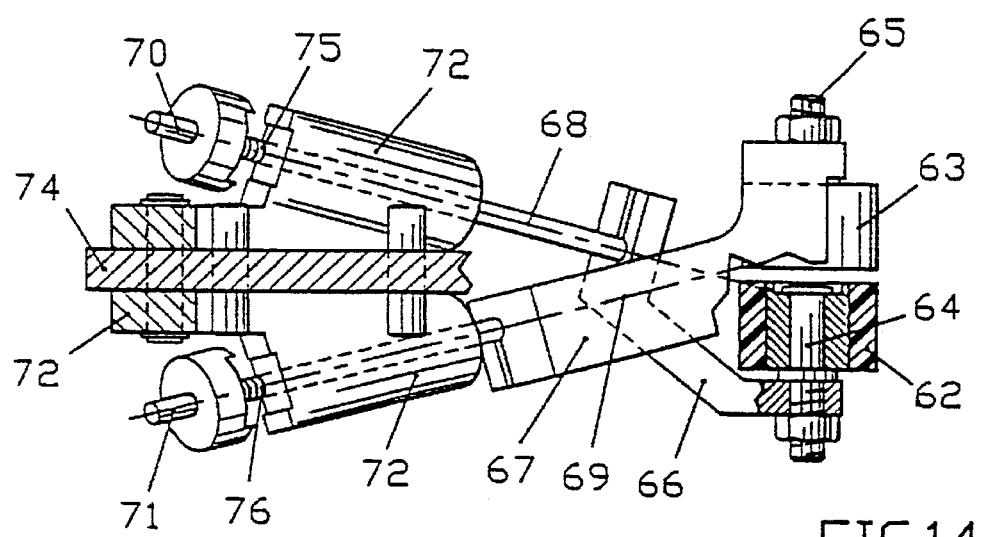
FIG. 14 is a top view of a compacting device shown in FIG. 13.
Figure 15:
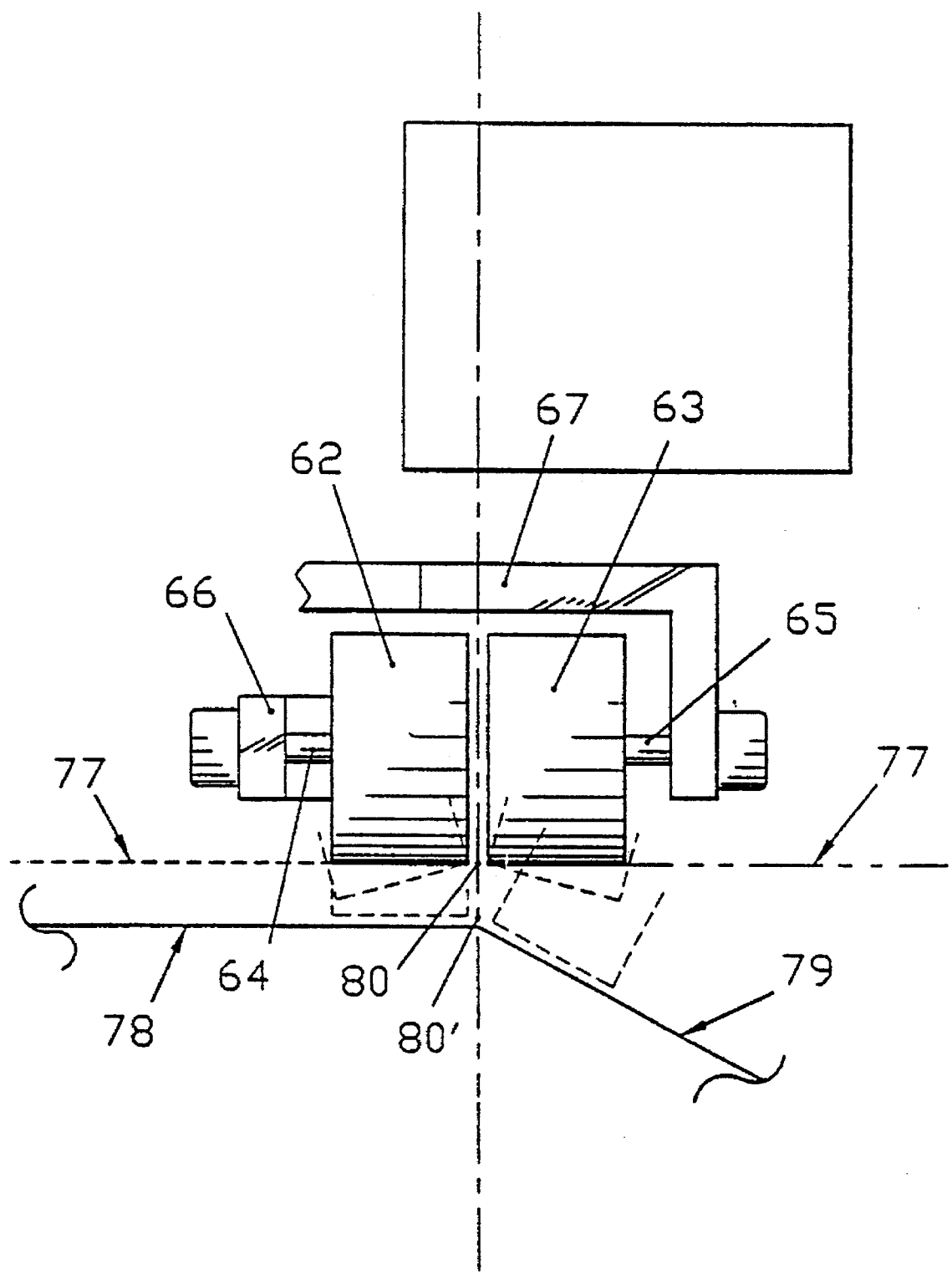
FIG. 15 is a right-hand view of the compacting device illustrated in FIG. 13.

According to another characteristic of the invention, the machine is provided with a device for compacting the rovings in place (61) mounted at the height of the roller 9 and immediately close to the latter, this device being shown in detail in FIGS. 13 to 15.

The device comprises two rollers 62,63 mounted free in rotation on two axes 64,65 fixed at the end of two arms 66,67 rotary-mounted around two axis 68,69 which respectively move to the center of the contact zone of each roller with the surface to be covered and enabling each roller to be independently oriented with respect to this surface.

The rods 70 and 71 defining the axes 68,69 are each mounted free in rotation on a bent element 72 biassed by a spring 73 anchored on a fixing plate 74 of the compacting device on the head T.

Two helical springs 75,76 joined onto the rods 70,71 are intended to constantly keep the rollers 62,63 in their twin (coaxial and side by side) position as shown on FIGS. 13 to 15.

Opposite a flat surface, as shown at 77 in FIGS. 13 and 15, the rollers 62,63 remain in the twin position, irrespective of the distance along the vertical axis Z from the pair of rollers 62,63 opposite the laying down head T.

When the rollers 62,63 are situated opposite different surface widths, as shown at 78 and 79 in FIG. 15, the rollers set their respective width by independently moving from one another, whilst remaining roughly tangential at their lower edge 80 by virtue of the continuous action of the springs 73,75 and 76 cladding (holding) the rollers against the surface, regardless of the mutual inclination of the surface widths 78,79 and the (80') spacing along the vertical axis Z of the rollers 62,63 opposite the head T, as shown on FIG. 15.

Figure 16:
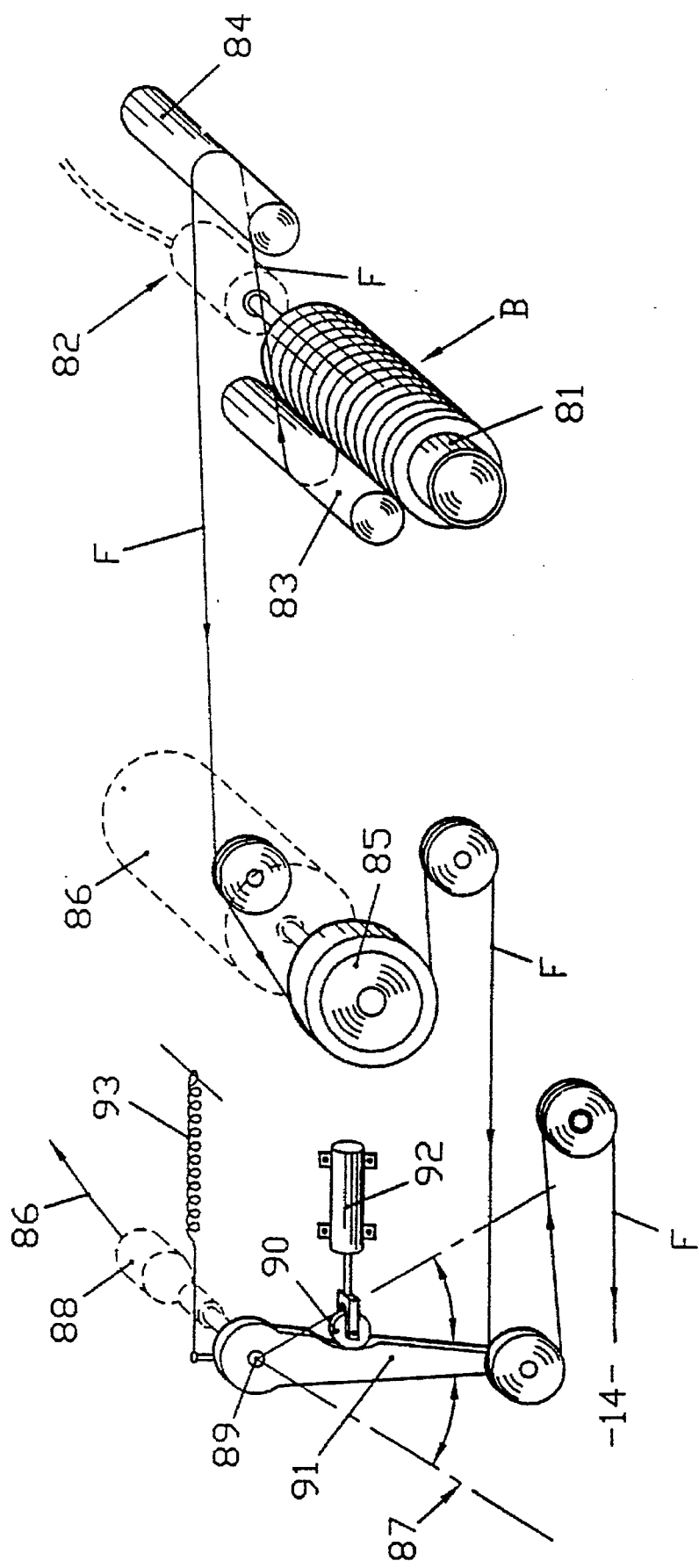
FIG. 16 is a perspective diagrammatic view of the means to reel off, brake and reduce the tension of a roving of the creel according to the invention.

FIG. 16 is an enlarged view of the device delivering a roving from the creel C shown on FIG. 1.

The creel C is formed of a box housing the fiber spools B having the same number as that of the roving used or likely to be used by the machine.

The spools B are horizontally disposed and mounted on a drum 81 driven in rotation by a pneumatic motor 82.

The roving F passes onto a sweeping roller 83 and then onto a return roller 84 towards a "pantin" or poppet type automatic control device comprising a pulley 85 driven by an electromotor 86 with a speed variator, a poppet 87 and a potentiometer 88 whose spin axis is integral with the spin axis 89 of the poppet and whose middle point controls the input of the variator of the motor 86.

The "pantin" or poppet 87, whose principle is well known, comprises a roller for controlling the pivoting arm 91 of the poppet driven by the rod of a pneumatic jack 92, the arm being elastically brought back by a spring 93.

FIGS. 17 to 20 illustrate another embodiment of a laying down/winding head T' and more specifically intended to lay down on a surface having a large slope of 45° for example, a convex or concave surface, such as symbolized at 94. This surface 94, belongs either to an element able to be driven in rotation or to a static element, that is not driven in rotation around a horizontal axis, this surface being able to be placed on a support able to modify the spatial position or presentation of the element to be covered opposite the laying down head T'.

The head T' is identical to the head T of FIG. 6, except that it is mounted on the head-support plate 7 so as to pivot both around the vertical axis 8 and a horizontal axis 95 perpendicular to the axis 8 and to the direction Y, as well as around an axis 96 intersecting the axes 8 and 95 and coaxial to the moving axis of the laying down or winding roller on the head T' in the direction of the element to be covered.

To this effect, the head T' comprises a flange 24 similar to that of the head T of FIG. 6 and secured to a rotary crown 97 driven in rotation around the axis 96 by an electromotor 98 (FIGS. 18 to 20) by means of a synchronous belt 99.

The crown 97 and the motor 98 are born by a first seating 100 mounted articulated around the horizontal axis 95 and activated by an electromotor 101 and by means of a synchronous belt 102.

The seating 100 and the motor 101 are borne by a second seating 103 rotary-mounted around the axis 8 by being fixed to the rotary element 23.

The seating 103 is provided with a passage 104 for the rovings F.

The seating 100 is disposed in such a way so as to enable the rovings F to pass towards the head T' and comprises for this purpose (FIGS. 19,20) a fork 105 integral with the crown 97 and bearing pulleys 106 for guiding the rovings. The crown 97 and the fork 105 are of course provided with a central passage 107 for the rovings.

As can be seen in FIGS. 18 to 20, the pulleys are disposed so as to ensure the mutual spatial offsetting of the six rovings F so as to be properly distributed in the direction of the two sets of pulleys 39 and 40 controlling the rovings on the head T'.

The machine shown in FIGS. 1 to 4 is able to carry out laying down as well as winding, the rollers 9 of the heads T1 to T4 being kept distanced from the elements to be wound (mandrels M), whereas the latter are driven into rotation by the poppets 10.

Of course, all the movements, displacements, rotations and activations of the various mobile or active members during the winding process are programmed and managed by a computer.

The multi-purpose nature (winding or laying down) of the machine makes it possible to have faster and easier start winding since the roving is initially glued onto the element to be wound by the winding head.

The rotation of the winding head around the vertical axis 8 enables to give to the winding of the roving around the element M the desired inclination with respect to the longitudinal axis of element.

The machine is also able to carry out on the elements M all the operations concerning laying down of the rovings F by automatically following the contour of the elements as they progressively rotate. The displacement along Z of the laying down roller 9 is mainly ensured by the girder 6 and the jack 36 borne by the laying down head is mainly intended to ensure that the roller applies a constant pressure on the element to be covered throughout laying down. The contour automatic follow-up with adjustment of the contact pressure of the roller 9 is obtained from analyzing the surface to be covered and a computer processing of the desired trajectories (Computer Assisted Design/Computer Assisted Manufacturing).

Even if the machine comprises only one contact laying down-winding head T, the fact, in accordance with the invention, of having to place the creel C at a fixed station makes it possible to lighten the head, render it more maneuverable, increase the number of rovings able to be simultaneously wound and/or laid down on a given head, this number able to be greater than six. Moreover, in the case of any breakage of a roving or similar problem at the level of the creel C, access and repair would be easier and faster.

However, the invention becomes even more advantageous by the possibility of vertically mounting several contact laying down-winding heads on a given support-girder mobile along Z, working in parallel and simultaneously, so that several identical elements are embodied at the same time, four in the example given here, but could be less or more. This both reduces the production cost of the elements and moreover guarantees that the elements have the same contact laying down-winding characteristics.

Moreover, the particular disposition of means for routing the rovings F between the creel C and the laying down/winding heads allows for free circulation around the machine under the gantry 1 and significantly reduces the scanning (traversing) of rovings upon movements along X,Y of the contact laying down-winding heads. This is why the rovings F scan (traverse) a vertical fan-shaped surface with a significantly reduced angle between the fixed pulleys 14 and the pulleys 15 mobile along X.

In addition, the implantation of sets of pulleys 14 and 15 reduces the jerks of the roving reeling speed. In fact, in the absence of the set of pulleys 14 which forms a fly-wheel of rovings between the creel C and the carriage 2, the traction on the rovings when the winding/laying down heads T1 to T4 move from the end of the elements M, creel C side, to the other end would be much stronger and have much greater amplitude. This reduction of the jerks of the roving reeling speed is particularly significant and advantageous at high winding speeds as it provides a large number of rovings.

During rotation of the heads around the vertical axis 8, the grid 29 prevents any of the rovings F becoming entangled, irrespective of the spacing of the roller 9 in relation to the element 24.

The free wheel pulley device and presser rollers (39,40, 39d,40d) avoids the backwards return of each roving and thus keeps it taut (upward side) on each roving cut by the cutting device (55).

The free wheel drive roller device and presser rollers (48,51) are able to dissociate the two ends of the cut roving, thus avoiding the gluing of the upward end by the roller 9 when laying down or at the end of the winding and ensure the appropriate pushing of the various rovings in the direction of the roller 9.

The compacting device (62 to 76) ensures a regular and full gluing of the rovings on the coated surface, thus following the inclination modifications of the surface by virtue of the rollers 62,63 biassed by the springs 73,75 and constantly and automatically clad against the rolling surface.

The means 81 to 92 for controlling the delivery of each roving F enable the machine to deal with the roving tension variations resulting from the method for laying down the rovings.

Laying down in fact requires roving tensions of about 1.5N, whereas winding involves roving tensions ranging up to 100N.

These means are thus able to annul the traction on the roving so as to facilitate gluing of the roving on the element at the starting of a winding or laying down. In fact, in this case, the rod of the jack 92 is retracted and the arm 91 of the poppet 87 takes up a position towards the right, as shown in FIG. 16, where the torque due to the recall spring 93 is equal to that due to traction of the roving. In this position, the motor 86 pulls on the roving so as to almost annul the tension due to the pneumatic motor 82 associated with the spool B.

The means 81 to 92 ensure braking of the roving at the time of winding so as to enable the roving to be reeled under a high tension, this being necessary to separate the roving charged with resin from the spool.

In order to do this, the jack 92 is fed with compressed air under an adjustable pressure. It presses the roller 90 onto the arm 91 of the poppet forcing it to come onto the left (FIG. 16). The potentiometer 88 then gives the order to the motor 86 to brake and no longer pull until the torque due to the tension of the roving balances the torque exerted by the jack 92 on the poppet 87.

The adjustment of the tension of the roving is effected by adjusting the air pressure in the jack 92.

Figure 17:
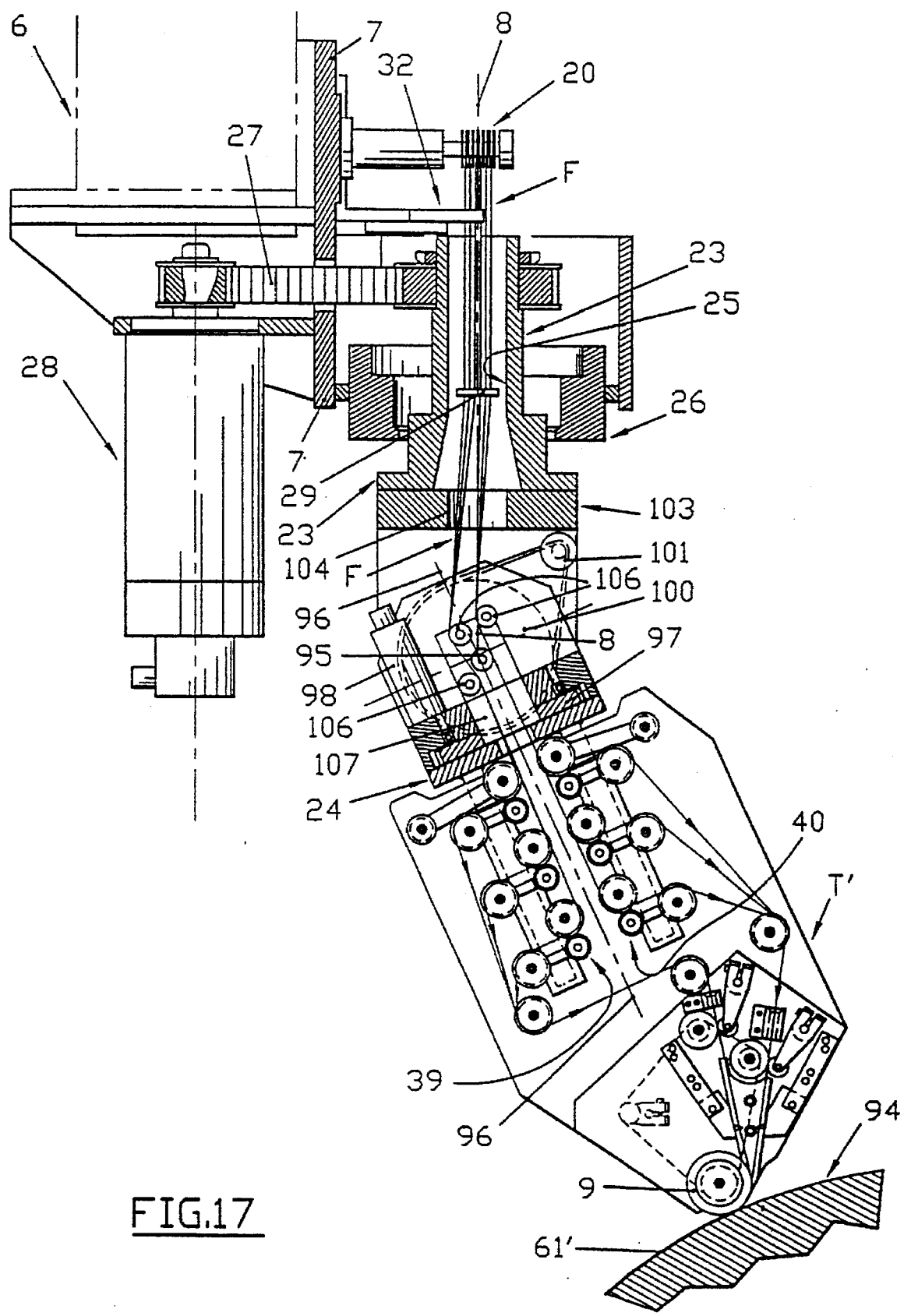
FIG. 17 illustrates another embodiment of one laying down head with three concurrent spin axes.

The head T' of FIG. 17 is more particularly intended for a laying down, but may also carry out a winding. Several heads T' may be disposed in parallel on a given plate girder 7 in the way of the heads T1 to T4 of the machine of FIGS. 1 to 4.

Finally, the invention is not merely limited to the embodiments described above but, on the other hand, covers all possible variants.

What is claimed is:

1. Machine for simultaneously winding/laying down of a plurality of individual rovings, comprising:

a gantry;

a laying down/winding head carrier mechanism plate supported by said gantry and movable in three Cartesian directions;

at least one laying down/winding head rotatably mounted on said mechanism plate around at least one vertical axis;

a laying down/winding roller rotatably mounted on each said at least one head, and movable with respect to an element to be covered;

means for presenting rovings on each said roller positioned as at least two tangential laps;

means for driving each roving and means for cutting each roving, said means for driving and said means for cutting being selectively activated;

a plurality of spools mounted on a fixed creel for delivering rovings to said at least one head; and sets of return pulleys structured and arranged to guide the rovings between the fixed creel and said at least one head, said sets of return pulleys comprising a first set of fixed pulleys having a horizontal axis adjacent to a ground surface and perpendicular to said element to be covered; a second set of pulleys integral with a carriage supporting said head carrier mechanism plate having an axis parallel to said horizontal axis, said first set of fixed pulleys and said second set of pulleys being structured and arranged so that the rovings between the first and second sets of pulleys move along a substantially vertical plane, in accordance with movement of said at least one head; and cascade pulleys integral with said carriage for feeding said rovings from said second sets of pulleys to a set of pulleys integral with said head carrier mechanism plate and disposed vertical to said at least one head.

2. The machine according to claim 1, wherein said means for driving each roving comprise a drive device associated with each said at least one laying down/winding head; said drive device comprising a free wheel, and a first roller mounted on said free wheel; said first roller capable of being simultaneously driven with said laying down/winding roller but with a peripheral speed slightly slower than that of said laying down/winding roller; a presser roller; and a roving non-return device comprising a pulley.

3. The machine according to claim 1, comprising, associated with each said at least one head, a device for compacting rovings placed upon said element to be covered, said device for compacting being disposed immediately after said laying down/winding roller and comprising two independent rollers that are freely rotatable around two crossed axes which pass to a center of a contact zone of each roller with a surface to be covered, respectively, and allow for orientation of each roller independently with respect to the surface; and means for continuously holding said rollers against the surface to be covered.

4. The machine according to claim 1, comprising a device positioned in said creel to deliver, brake and cancel the reeling tension for each roving, comprising:

a fiber spool;

a pneumatic motor for rotatably driving said fiber spool;

a poppet control device including an electric variable speed gear comprising an input, said gear driving a pulley for pulling the roving;

a poppet including an arm and an axis of rotation;

a potentiometer including an axis of rotation which is integral with the axis of rotation of said poppet, and a center point controlling said input of said gear; and a device for controlling said arm of said poppet for reeling the roving with tensions suitable for winding and laying down.

5. The machine according to claim 1, wherein each said at least one laying down/winding head comprises:

a rotatable element mounted on said mechanism plate and driven in rotation around said at least one vertical axis, said element including a first central passage for the rovings;

a circular flange comprising a second central passage for the rovings, said flange being fixed to said element, and said second central passage including a longitudinal axis;

a support mounted on the flange so as to move in translation along an axis merged with said at least one vertical axis of said at least one head, said support bearing said laying down/winding roller, said means for driving each roving, and said means for cutting each roving, as well as sets of roving guiding and non-return pulleys; and a roving guide grid rotatably mounted in said first central passage of said element for guiding the rovings as the rovings are brought grouped into a bundle substantially parallel to the longitudinal axis of said second central passage of said circular flange and said at least one vertical axis.

6. The machine according to claim 5, wherein said flange of each said at least one head is rotatably mounted on a first seating; said first seating is rotatably mounted on a second seating; said second seating is rotatably mounted on said mechanism plate on said element around said at least one vertical axis; said first seating comprise an axis of rotation that is perpendicular to said longitudinal axis of said flange and an axis of rotation of said second seating; said first seating and said second seating include passages so that the rovings are guided into the first central passage of said element, said second central passage of said flange, said passages of said first seating and said second seating by said wire guide grid and by a set of pulleys carried by said first seating.

7. The machine according to claim 5, wherein said support mounted on said flange comprises a support plate including two sides; and said means for cutting each roving of each lap comprise control levers joined onto a common axis traversing one side of the support plate of each said at least one head; superimposed jacks disposed on the other side of the support plate; a lever system connected to said superimposed jacks; and coaxial rotation parts traversing said support plate associated with said lever system.

8. The machine according to claim 7, wherein said means for driving each roving comprise a drive device associated with each said at least one laying down/winding head; said drive device comprising a free wheel, and a first roller mounted on said free wheel; said first roller capable of being simultaneously driven with said laying down/winding roller but with a peripheral speed slightly slower than that of said laying down/winding roller; a presser roller; and a roving non-return device comprising a pulley.

9. The machine according to claim 7, comprising, associated with each said at least one head, a device for compacting rovings placed upon said element to be covered, said device for compacting being disposed immediately after said laying down/winding roller and comprising two independent rollers that are freely rotatable around two crossed axes which pass to a center of a contact zone of each roller with a surface to be covered, respectively, and allow for orientation of each roller independently with respect to the surface; and means for continuously holding said rollers against the surface to be covered.

10. The machine according to claim 1, comprising a plurality of heads mounted in parallel on said mechanism plate feedable with rovings from said creel and capable of simultaneously covering, by at least one of winding and laying down, a corresponding plurality of parts disposed in parallel on a given bench, the rotation of each part being synchronized with the machine.

11. The machine according to claim 10, wherein said means for driving each roving comprise a drive device associated with each of said plurality of heads; said drive device comprising a free wheel, and a first roller mounted on said free wheel; said first roller capable of being simultaneously driven with said laying down/winding roller but with a peripheral speed slightly slower than that of said laying down/winding roller; a presser roller; and a roving non-return device comprising a pulley.

12. The machine according to claim 10, comprising, associated with each of said plurality of heads, a device for compacting rovings placed upon said element to be covered, said device for compacting being disposed immediately after said laying down/winding roller and comprising two independent rollers that are freely rotatable around two crossed axes which pass to a center of a contact zone of each roller with a surface to be covered, respectively, and allow for orientation of each roller independently with respect to the surface; and means for continuously holding said rollers against the surface to be covered.

13. The machine according to claim 10, wherein each of said plurality of heads comprises:

a rotatable element mounted on said mechanism plate and driven in rotation around said at least one vertical axis, said element including a first central passage for the rovings;

a circular flange comprising a second central passage for the rovings, said flange being fixed to said element, and said second central passage including a longitudinal axis;

a support mounted on the flange so as to move in translation along an axis merged with said vertical axis of said head, said support bearing said laying down/winding roller, said means for driving each roving, and said means for cutting each roving, as well as sets of roving guiding and non-return pulleys; and a roving guide grid rotatably mounted in said first central passage of said element for guiding the rovings as the rovings are brought grouped into a bundle substantially parallel to the longitudinal axis of said second central passage of said circular flange and said vertical axis.

14. The machine according to claim 13, wherein said flange of each of said plurality of heads is rotatably mounted on a first seating; said first seating is rotatably mounted on a second seating; said second seating is rotatably mounted on said mechanism plate on said element around said vertical axis; said first seating comprise an axis of rotation that is perpendicular to said longitudinal axis of said flange and an axis of rotation of said second seating; said first seating and said second seating include passages so that the rovings are guided into the first central passage of said element, said second central passage of said flange, said passages of said first seating and said second seating by said wire guide grid and by a set of pulleys carried by said first seating.

15. The machine according to claim 13, wherein said support mounted on said flange comprises a support plate including two sides; and said means for cutting each roving of each lap comprise control levers joined onto a common axis traversing one side of the support plate of each said head; superimposed jacks disposed on the other side of the support plate; a lever system connected to said superimposed jacks; and coaxial rotation parts traversing said support plate associated with said lever system.

16. The machine according to claim 15, wherein said means for driving each roving comprise a drive device associated with each of said plurality of heads; said drive device comprising a free wheel, and a first roller mounted on said free wheel; said first roller capable of being simultaneously driven with said laying down/winding roller but with a peripheral speed slightly slower than that of said laying down/winding roller; a presser roller; and a roving non-return device comprising a pulley.

17. The machine according to claim 15, comprising, associated with each of said plurality of heads, a device for compacting rovings placed upon said element to be covered, said device for compacting being disposed immediately after said laying down/winding roller and comprising two independent rollers that are freely rotatable around two crossed axes which pass to a center of a contact zone of each roller with a surface to be covered, respectively, and allow for orientation of each roller independently with respect to the surface; and means for continuously holding said rollers against the surface to be covered.

18. The machine according to claim 15, wherein said sets of return pulleys guide the rovings between the creel and each of said plurality of heads, and said second set of pulleys being structured and arranged so that the rovings between the first and second set of pulleys move along said substantially vertical plane, in accordance with movement of said plurality of heads; and cascade pulleys integral with said carriage for feeding said rovings from said second sets of pulleys to said set of pulleys integral with said head carrier mechanism plate and disposed vertical to said plurality of heads.

* * * * *